(12) United States Patent
Gopal et al.

(10) Patent No.: US 9,973,207 B2
(45) Date of Patent: May 15, 2018

(54) TECHNOLOGIES FOR HEURISTIC HUFFMAN CODE GENERATION

(71) Applicant: Intel Corporation, Santa Clara, CA (US)

(72) Inventors: Vinodh Gopal, Westborough, MA (US); James D. Guilford, Northborough, MA (US)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 15/639,602

(22) Filed: Jun. 30, 2017

(65) Prior Publication Data

US 2018/0026656 A1  Jan. 25, 2018

Related U.S. Application Data

(60) Provisional application No. 62/365,969, filed on Jul. 22, 2016, provisional application No. 62/376,859, filed on Aug. 18, 2016, provisional application No. 62/427,268, filed on Nov. 29, 2016.

(51) Int. Cl.
*H03M 7/40* (2006.01)
*H03M 7/30* (2006.01)

(52) U.S. Cl.
CPC .......... *H03M 7/40* (2013.01); *H03M 7/3086* (2013.01)

(58) Field of Classification Search
CPC ..... H03M 7/40; H03M 7/3084; H03M 7/3086
USPC ........................................ 341/51, 65, 67, 107
See application file for complete search history.

(56) References Cited

U.S. PATENT DOCUMENTS

| | | | |
|---|---|---|---|
| 6,919,826 B1 * | 7/2005 | Peacock | H03M 7/40 341/107 |
| 7,064,489 B2 * | 6/2006 | Price | G06T 9/005 314/65 |

* cited by examiner

*Primary Examiner* — Khai M Nguyen
(74) *Attorney, Agent, or Firm* — Barnes & Thornburg LLP

(57) ABSTRACT

Technologies for heuristic Huffman code generation include a computing device that generates a weighted list of symbols for a data block. The computing device determines a threshold weight and identifies one or more lightweight symbols in the list that have a weight less than or equal to the threshold weight. The threshold weight may be the average weight of all symbols with non-zero weight in the list. The computing device generates a balanced sub-tree of nodes for the lightweight symbols, with each lightweight symbol associated with a leaf node. The computing device adds the remaining symbols and the root of the balanced sub-tree to a heap and generates a Huffman code tree by processing the heap. The threshold weight may be adjusted to tune performance and compression ratio. Other embodiments are described and claimed.

24 Claims, 17 Drawing Sheets

TECHNOLOGIES FOR HEURISTIC HUFFMAN CODE GENERATION

CROSS-REFERENCE TO RELATED APPLICATIONS

The present application claims the benefit of U.S. Provisional Patent Application No. 62/365,969, filed Jul. 22, 2016, U.S. Provisional Patent Application No. 62/376,859, filed Aug. 18, 2016, and U.S. Provisional Patent Application No. 62/427,268, filed Nov. 29, 2016.

BACKGROUND

Data compression is an important computer operation used in many computing applications, including both server and client applications. For example, data compression may be used to reduce network bandwidth requirements and/or storage requirements for cloud computing applications.

Many common lossless compression formats are based on the LZ77 compression algorithm. Data compressed using LZ77-based algorithms typically include a stream of symbols (or "tokens"). Each symbol may include literal data that is to be copied to the output or a reference to repeat data that has already been decompressed. The DEFLATE algorithm uses LZ77 compression in combination with Huffman encoding to generate compressed output. The DEFLATE algorithm supports dynamic Huffman codes as well as static Huffman codes. Typical encoders may analyze a message block and generate an optimum Huffman code in a first pass through the message block, and then perform substitution of the symbols into variable length prefix codes in a second pass through the message block.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
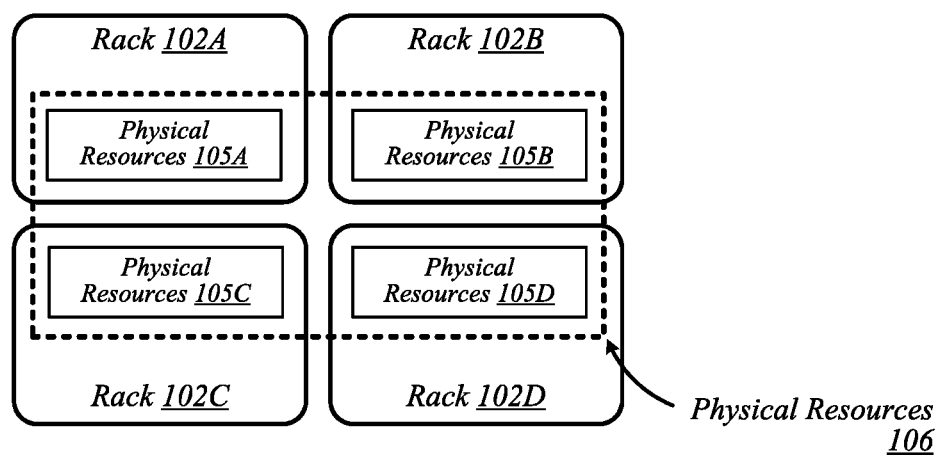
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as dual inline memory modules (DIMMs), are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, application-specific integrated circuits (ASICs), etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
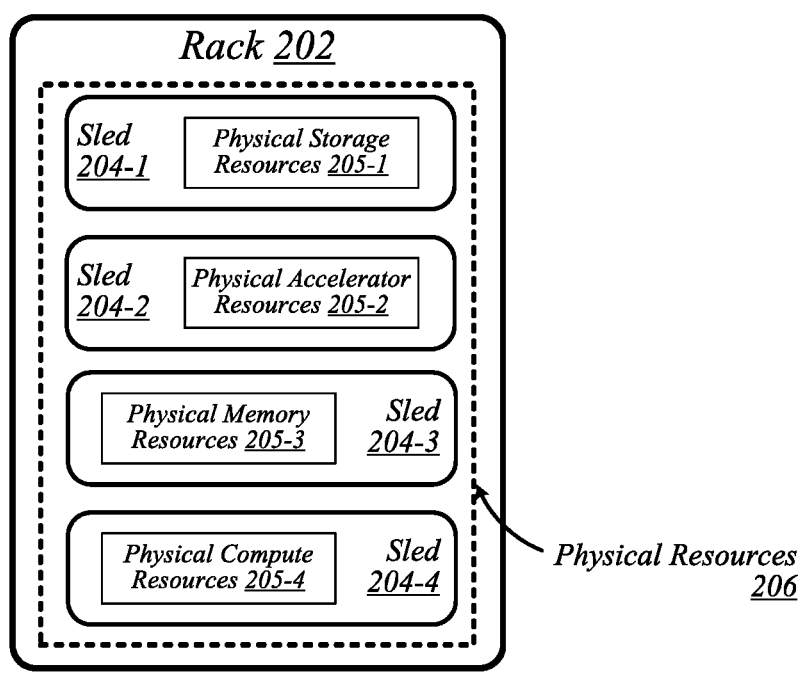
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
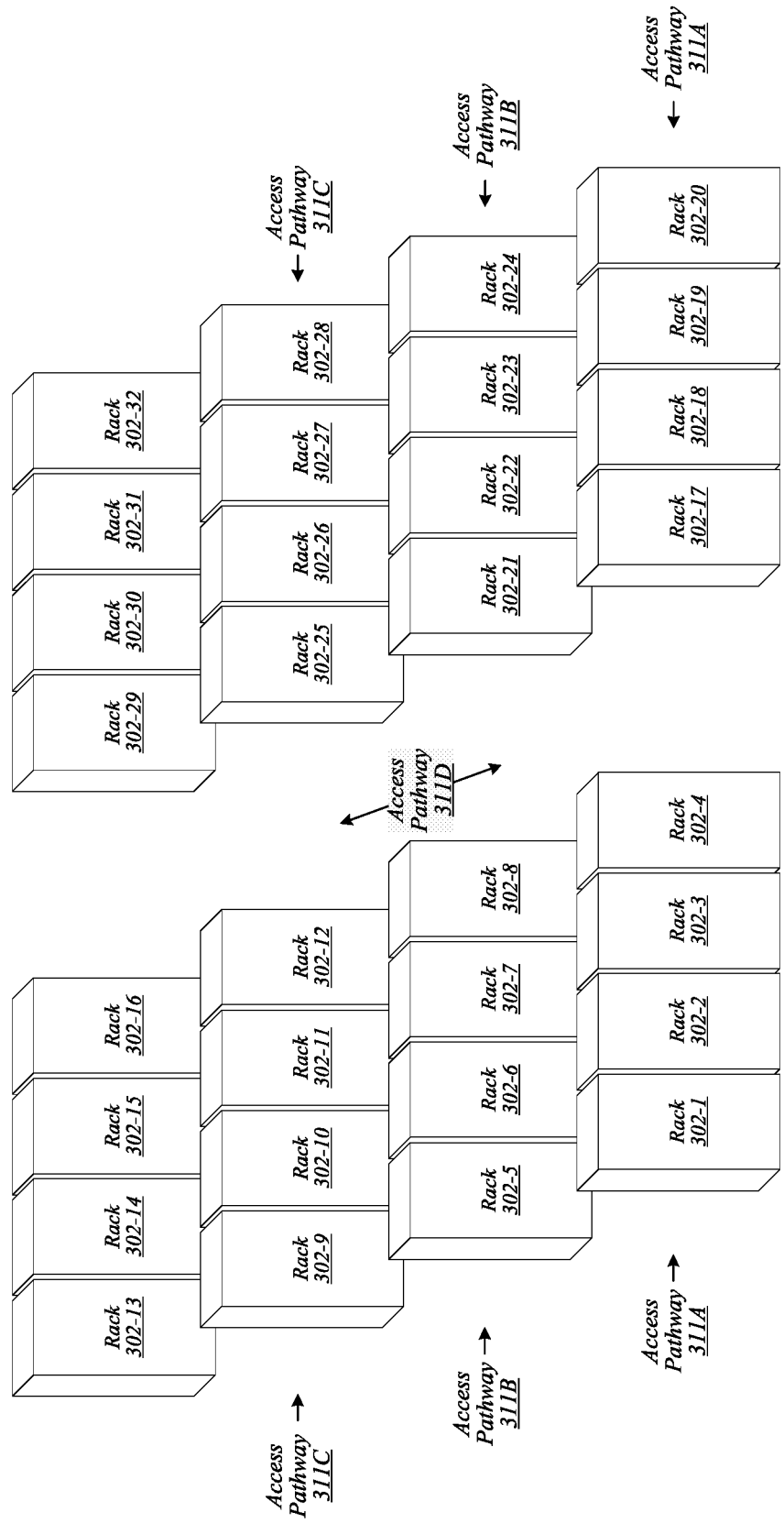
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
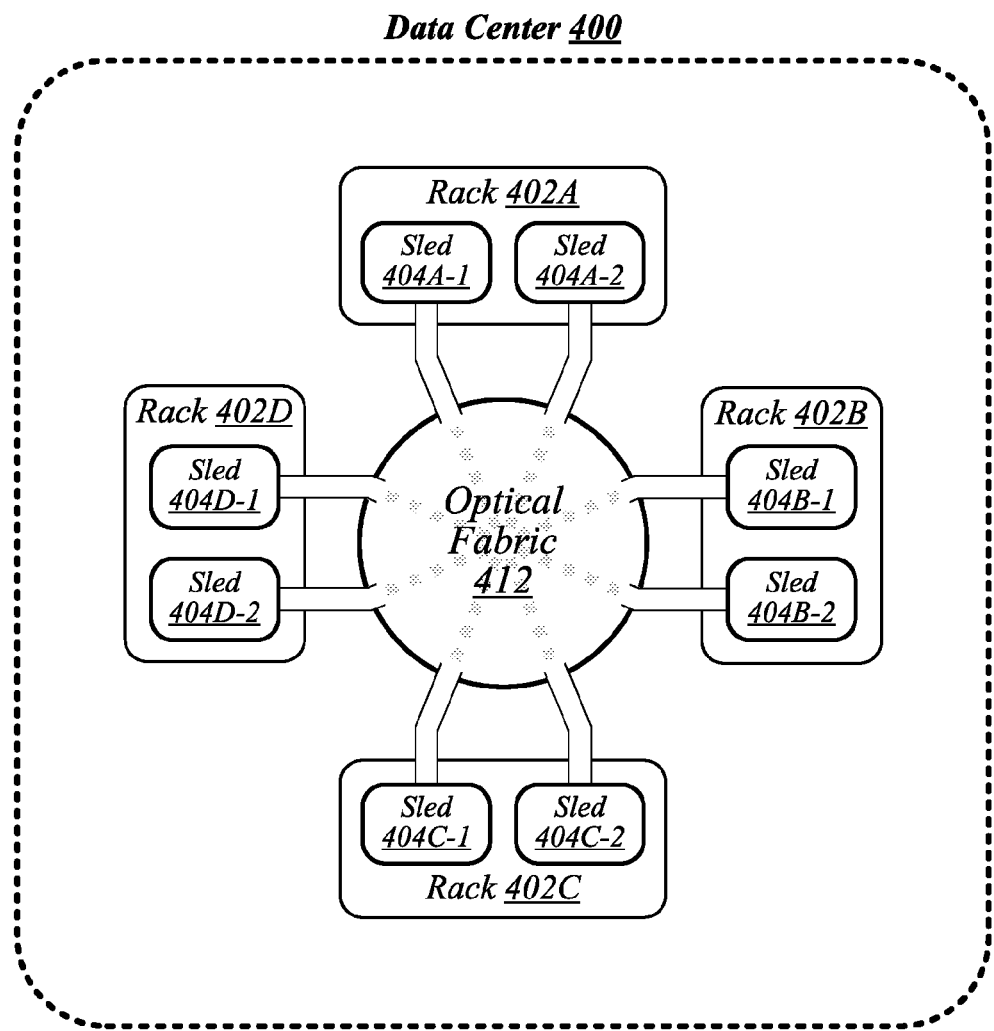
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
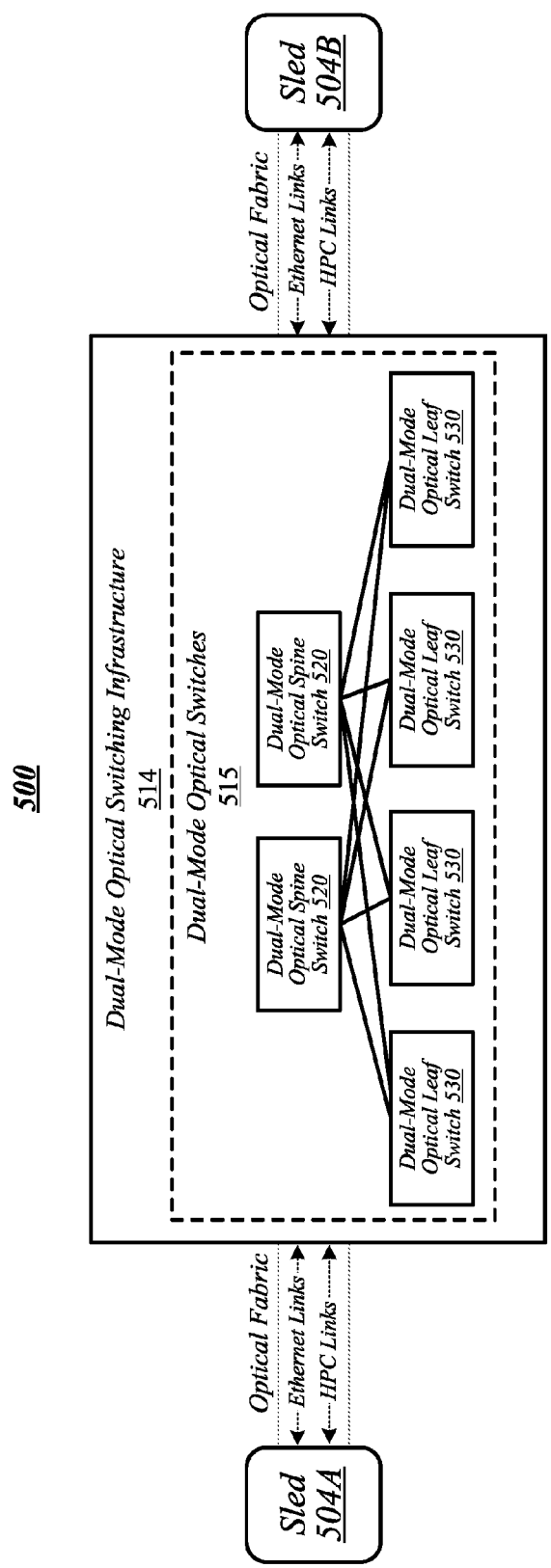
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
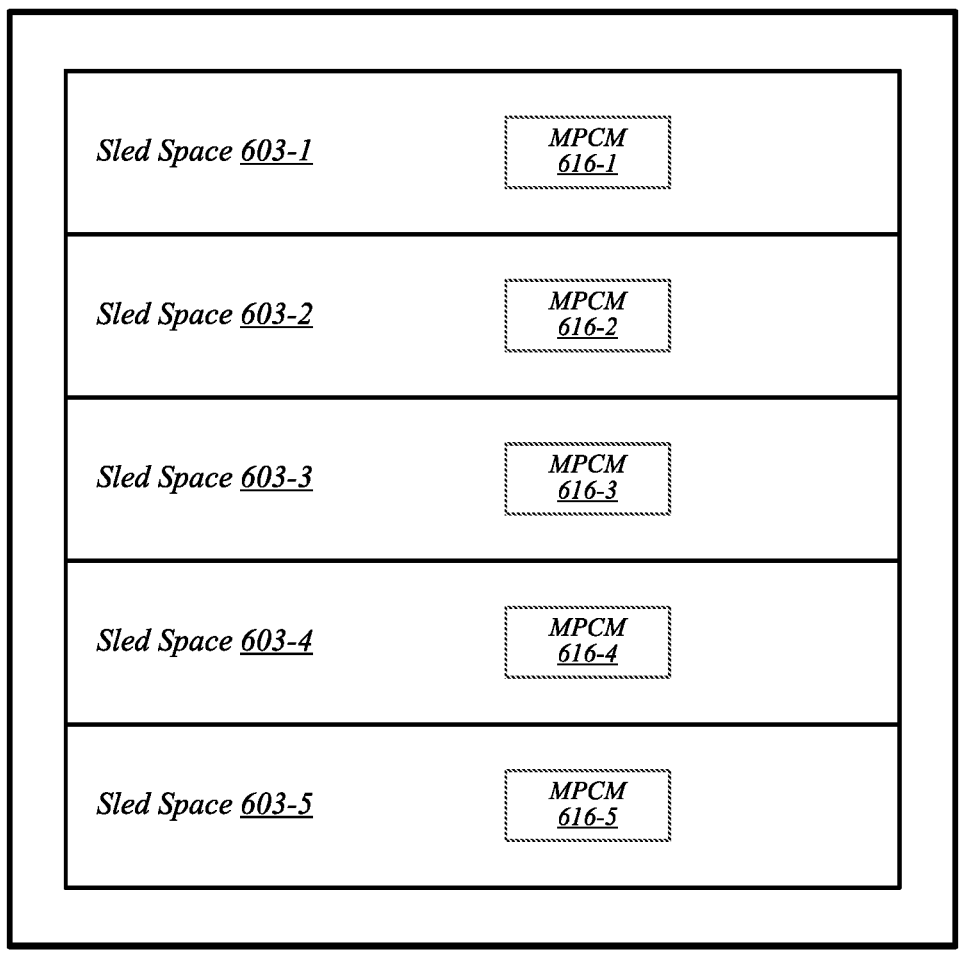
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
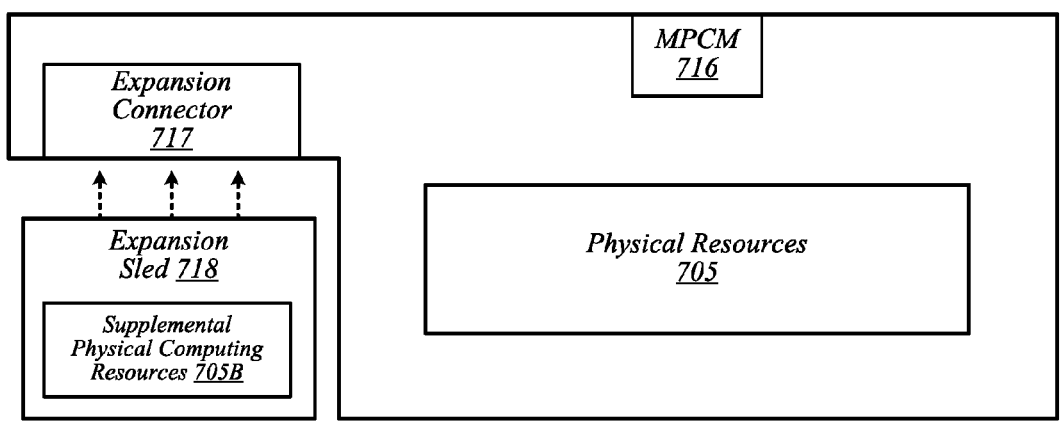
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
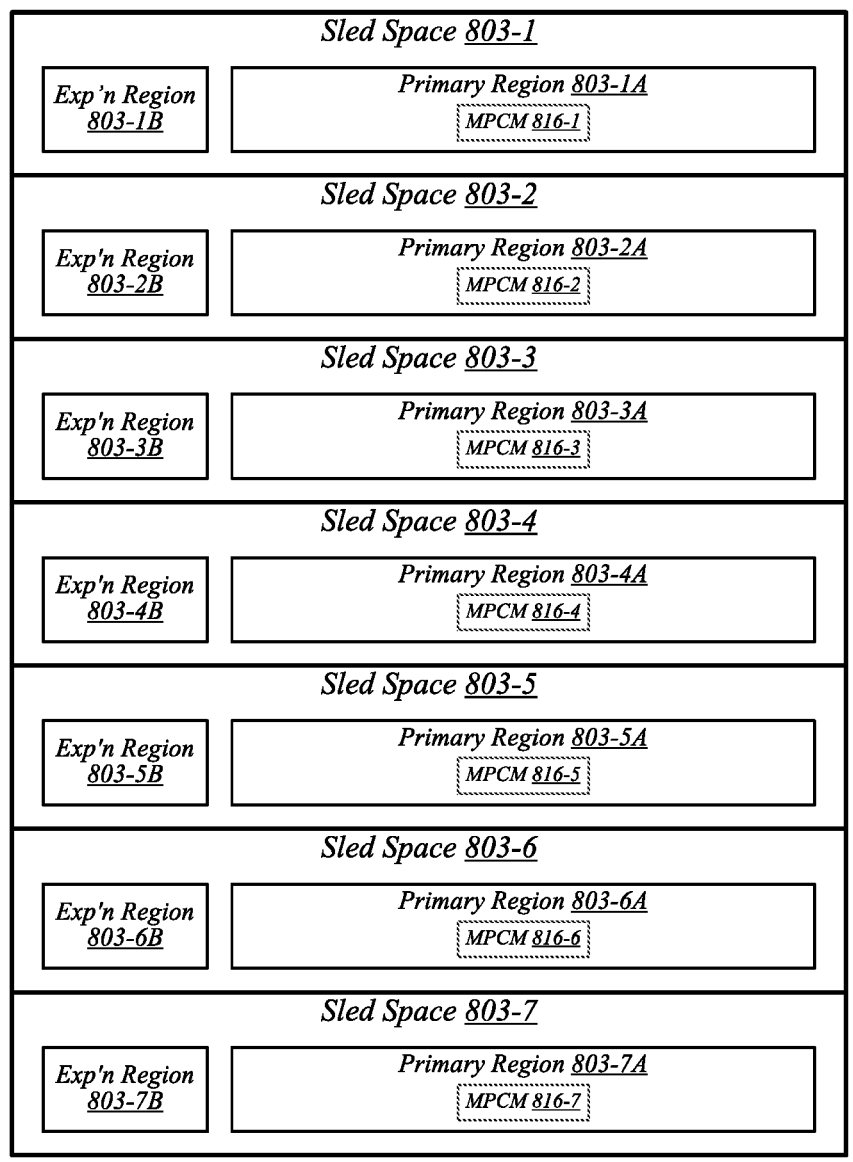
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
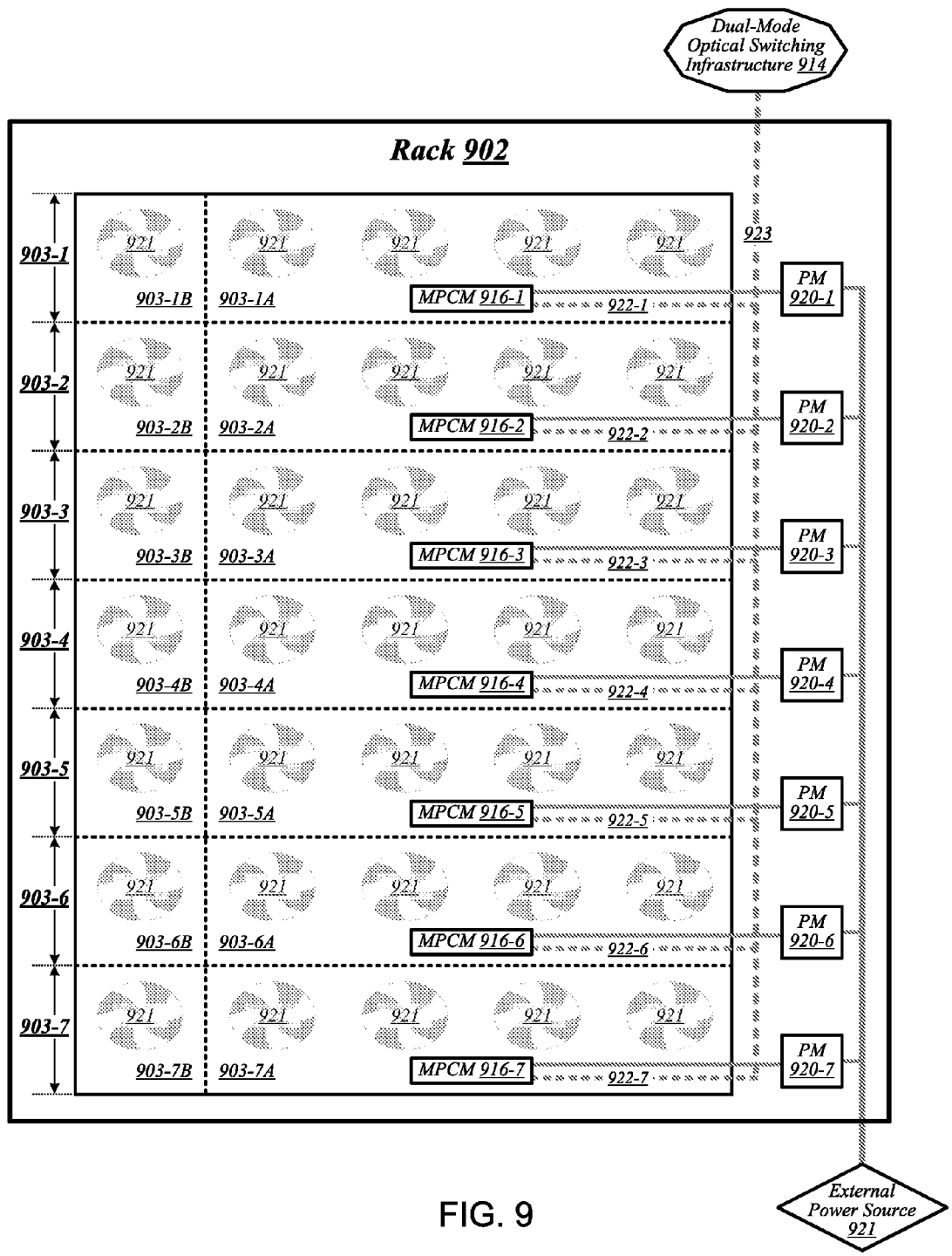
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
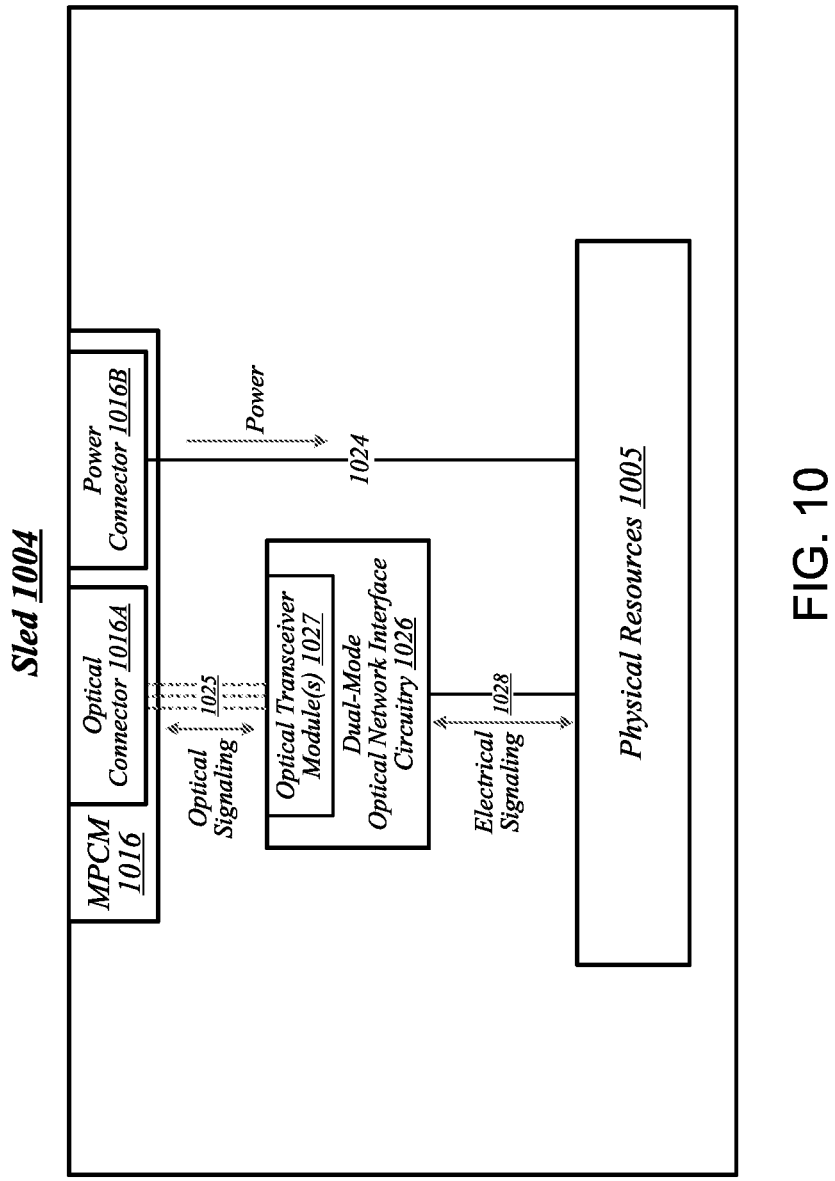
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heat pipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
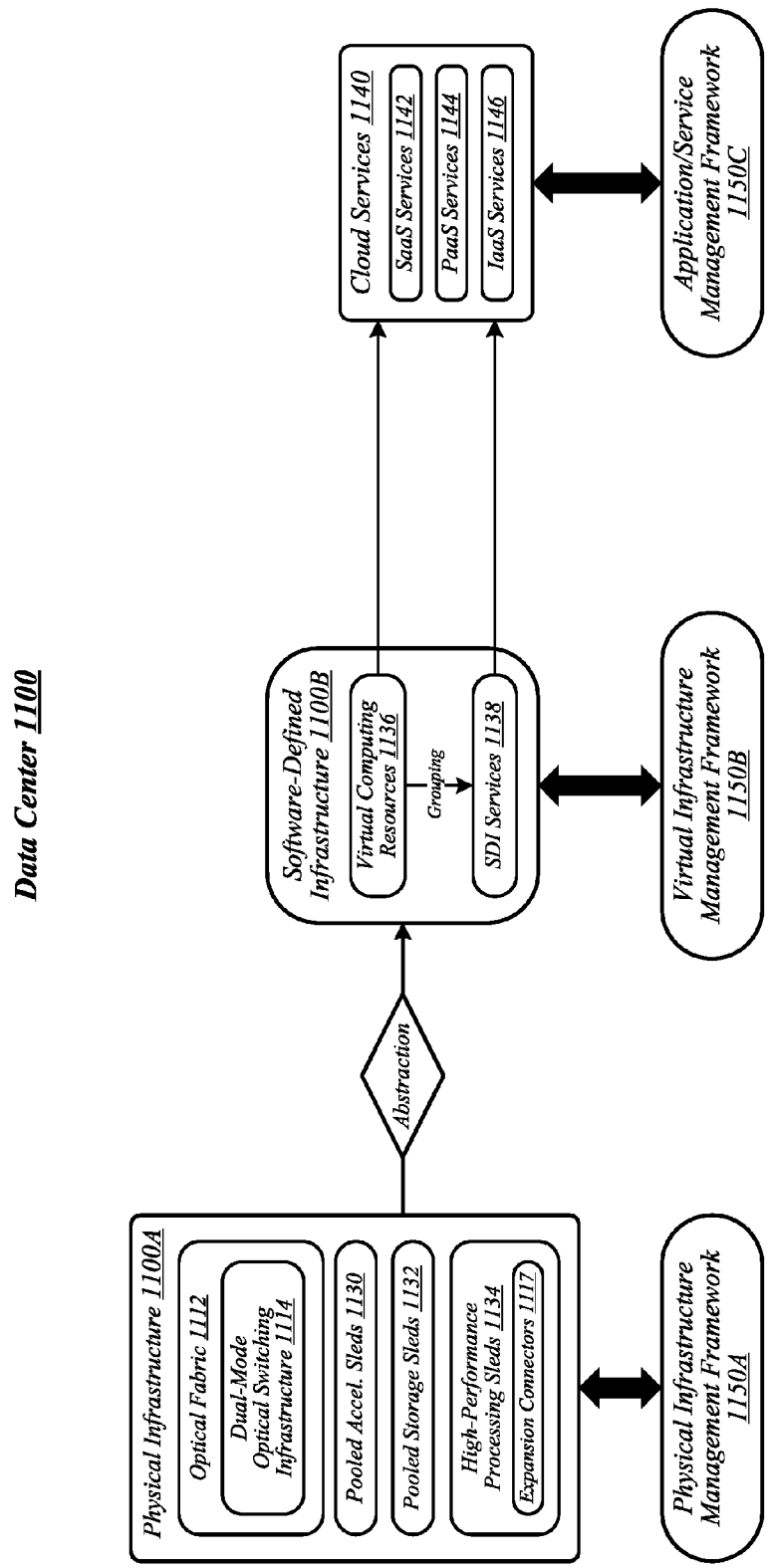
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide quality of service (QoS) management capabilities for cloud services 1140. The embodiments are not limited in this context.

Figure 12:
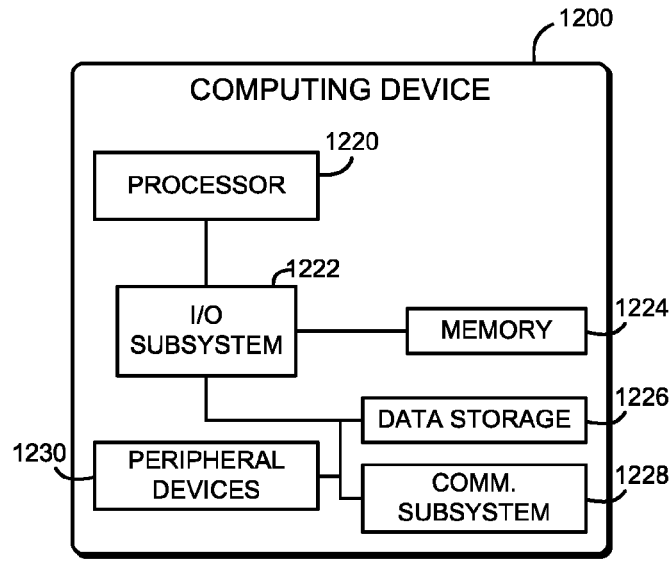
FIG. 12 is a simplified block diagram of at least one embodiment of a computing device for heuristic Huffman code generation.

Referring now to FIG. 12, an illustrative computing device 1200 for heuristic Huffman code generation includes a processor 1220, an input/output (I/O) subsystem 1222, a memory 1224, and a data storage device 1226. The computing device 1200 may be embodied as server computer, a rack server, a blade server, a compute node, and/or a sled in a data center, such as a sled 204 as described above in connection with FIG. 2, a sled of the physical infrastructure 1100A as described above in connection with FIG. 11, or another sled of the data center.

In use, as described below, the computing device 1200 compresses a data block using the DEFLATE algorithm. As part of the algorithm, the computing device 1200 generates a list of symbols with corresponding weights (e.g., frequencies of occurrence). The symbols may be literal/length symbols or distance symbols generated by an LZ77-based algorithm. Based on a heuristic threshold weight, the computing device 1200 divides the symbols into lightweight symbols and other symbols. The computing device 1200 generates a balanced sub-tree from the lightweight symbols—which does not require sorting the symbols—and then performs heap-based processing on the remaining symbols and the root of the sub-tree to generate a Huffman code tree. In some embodiments, the computing device 1200 may use a simplified heuristic, for example creating a single balanced tree for all symbols, or by creating two balanced sub-trees (one for lightweight symbols and another for the remaining symbols) and then joining the sub-trees at a root node. By avoiding heap operations for certain symbols, the computing device 1200 may generate a Huffman code with improved performance compared to a 2-pass optimal Huffman code algorithm, while also providing better a compression ratio than a static or otherwise predetermined Huffman code. Additionally, the heuristic threshold may be adjusted to tune the compression ratio achieved versus the computational cost. For example, the heuristic algorithm may be tuned between achieving a compression ratio of about 0.465 for a computational cost of about 1 cycle/byte and achieving a compression ratio of about 0.440 for a computational cost of about 2.75 cycles/byte. Various simplified heuristic compression ratios may achieve a compression ratio of about 0.50 or about 0.46 for a computation cost of about 0.5 cycles/byte. In some embodiments, the computing device 1200 may provide improved Huffman code generation performance that keeps up with a hardware match engine that may generate symbols very quickly. Additionally, the computing device 1200 may provide an appropriate balance of performance and compression ratio for relatively small data blocks, such as 8 kB storage blocks.

The processor 1220 may be embodied as any type of processor capable of performing the functions described herein. For example, the processor 1220 may be embodied as a single or multi-core processor(s), digital signal processor, microcontroller, or other processor or processing/controlling circuit. Similarly, the memory 1224 may be embodied as any type of volatile or non-volatile memory or data storage capable of performing the functions described herein. In operation, the memory 1224 may store various data and software used during operation of the computing device 1200 such operating systems, applications, programs, libraries, and drivers. The memory 1224 is communicatively coupled to the processor 1220 via the I/O subsystem 1222, which may be embodied as circuitry and/or components to facilitate input/output operations with the processor 1220, the memory 1224, and other components of the computing device 1200. For example, the I/O subsystem 1222 may be embodied as, or otherwise include, memory controller hubs, input/output control hubs, sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 1222 may form a portion of a system-on-a-chip (SoC) and be incorporated, along with the processor 1220, the memory 1224, and other components of the computing device 1200, on a single integrated circuit chip.

The data storage device 1226 may be embodied as any type of device or devices configured for short-term or long-term storage of data such as, for example, memory devices and circuits, memory cards, hard disk drives, solid-state drives, non-volatile flash memory, or other data storage devices. The computing device 1200 may also include a communications subsystem 1228, which may be embodied as any communication circuit, device, or collection thereof, capable of enabling communications between the computing device 1200 and other remote devices over a computer network (not shown). The communications subsystem 1228 may be configured to use any one or more communication technology (e.g., wired or wireless communications) and associated protocols (e.g., Ethernet, InfiniBand®, Bluetooth®, Wi-Fi®, WiMAX, 3G, 4G LTE, etc.) to effect such communication.

The computing device 1200 may further include one or more peripheral devices 1230. The peripheral devices 1230 may include any number of additional input/output devices, interface devices, hardware accelerators, and/or other peripheral devices. For example, in some embodiments, the peripheral devices 1230 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

Figure 13:
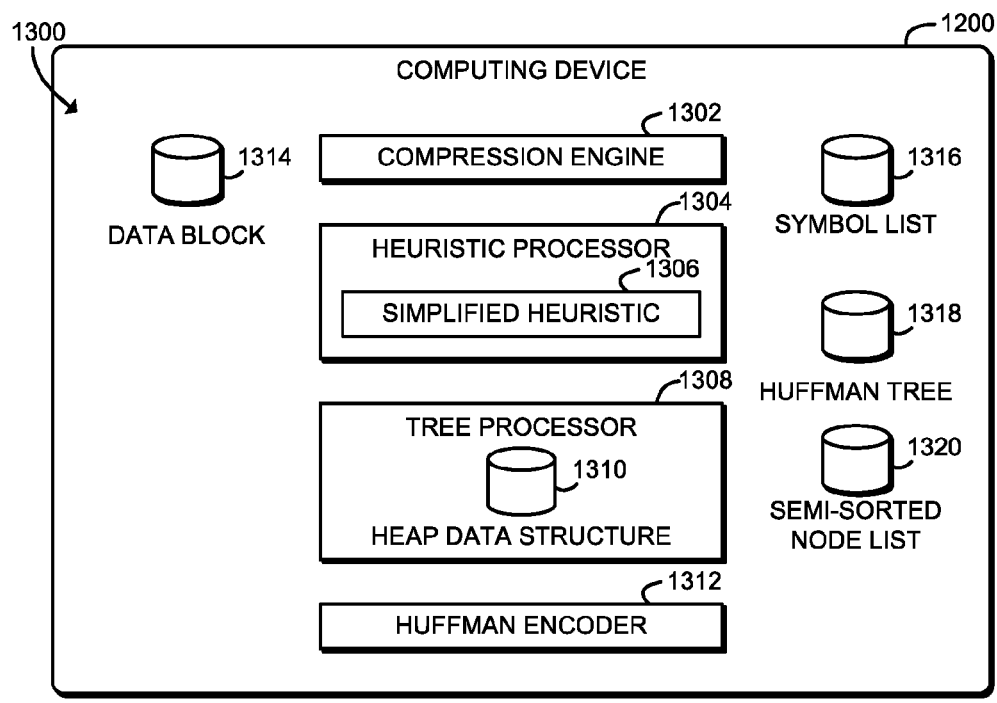
FIG. 13 is a simplified block diagram of at least one embodiment of an environment of the computing device of FIG. 12.

Referring now to FIG. 13, in an illustrative embodiment, the computing device 1200 establishes an environment 1300 during operation. The illustrative environment 1300 includes a compression engine 1302, a heuristic processor 1304, a tree processor 1308, and a Huffman encoder 1312. The various components of the environment 1300 may be embodied as hardware, firmware, software, or a combination thereof. As such, in some embodiments, one or more of the components of the environment 1300 may be embodied as circuitry or collection of electrical devices (e.g., compression engine circuitry 1302, heuristic processor circuitry 1304, tree processor circuitry 1308, and/or Huffman encoder circuitry 1312). It should be appreciated that, in such embodiments, one or more of the compression engine circuitry 1302, the heuristic processor circuitry 1304, the tree processor circuitry 1308, and/or the Huffman encoder circuitry 1312 may form a portion of the processor 1220, the I/O subsystem 1222, the communications subsystem 1228, and/or other components of the computing device 1200. Additionally, in some embodiments, one or more of the illustrative components may form a portion of another component and/or one or more of the illustrative components may be independent of one another.

The compression engine 1302 is configured to generate a list 1316 of symbols from an input data block 1314. The compression engine 1302 may execute an LZ77-based compression algorithm (e.g., DEFLATE) to match repeated strings of bytes in the data block 1314. After finding matching strings in the data block 1314, the compression engine 1302 may output literal symbols that represent literal bytes in the data block 1314 or length symbols and distance symbols which together represent a matching repeated string. The symbol list 1316 may include length/literal symbols (which use the same Huffman code in the DEFLATE compression format) or distance symbols. Each symbol of the symbol list 1316 is associated with a corresponding weight, which may be embodied as a frequency of occurrence of that symbol in the data block 1314. The compression engine 1302 may also generate compression statistics, including the number of symbols with non-zero weight and the total weight of all symbols. The compression engine 1302 may be embodied as a software component executed by the processor 1220 or, in some embodiments, a hardware compression engine, accelerator, or other hardware offload engine.

The heuristic processor 1304 is configured to determine a threshold weight for the symbol list 1316. For example, in some embodiments the threshold weight may be an average weight for each symbol or the average weight scaled by a predetermined scaling factor. In some embodiments, the threshold weight may be constant, user-specified, or otherwise predetermined. The heuristic processor 1304 is further configured to identify one or more lightweight symbols of the symbol list 1316. The weight of each lightweight symbol has a predetermined relationship to the threshold weight (e.g., less than or equal, less than, or other appropriate relationship). The heuristic processor 1304 is further configured to generate a balanced sub-tree of nodes for the lightweight symbols. Each of the lightweight symbols is associated with a leaf node of the balanced sub-tree. The nodes of the balanced sub-tree, except for the root node, may be added to a semi-sorted node list 1320.

In some embodiments, the heuristic processor 1304 may be configured to identify all symbols of the symbol list 1316 as the one or more lightweight symbols, meaning the entire symbol list 1316 would be included in the balanced sub-tree. For example, the threshold weight may be set to the maximum weight of the symbol list 1316, or each symbol may be included in the balanced sub-tree without checking against the threshold weight. Additionally or alternatively, in some embodiments, the heuristic processor 1304 may be configured to generate another balanced sub-tree of nodes for the remaining symbols of the symbol list 1316 (other than the lightweight symbols). Each of the remaining symbols is associated with a leaf node of the balanced sub-tree. In those embodiments, the heuristic processor 1304 may be configured to join both balanced sub-trees with a root node to generate a Huffman code tree 1318. In some embodiments, those functions may be performed by one or more subcomponents, such as a simplified heuristic processor 1306.

The tree processor 1308 is configured to generate a Huffman code tree 1318 for any remaining symbols of the symbol list 1316 (other than the lightweight symbols) and the root node of the balanced sub-tree (which includes the lightweight symbols). Generating the Huffman code tree 1318 may include adding the remaining symbols and the root node to a heap data structure 1310. The heap 1310 may be embodied as a min-heap, with each node having a smaller associated weight than its child nodes. Accordingly, the node having the smallest associated weight is at the top of the heap 1310. The tree processor 1308 may be configured to, while the heap 1310 includes more than one node, pop two nodes from the heap data structure (which have the two smallest associated weights in the heap 1310), create a parent node for the popped nodes with a weight equal to the sum of the weights of the popped nodes, and insert the newly created parent node in the heap 1310. The tree processor 1308 may be configured to add the popped nodes to the semi-sorted list of nodes 1320. In some embodiments, instead of popping two nodes, the tree processor 1308 may pop one node and then replace the top node of heap 1310 with the new parent node.

The Huffman encoder 1312 is configured to compute a Huffman code length for each symbol of the symbol list 1316, based on a depth of a corresponding node in the Huffman code tree 1318. The Huffman encoder 1312 may be further configured to encode a block of symbols corresponding to the data block 1314 using the Huffman code lengths.

Figure 14A:
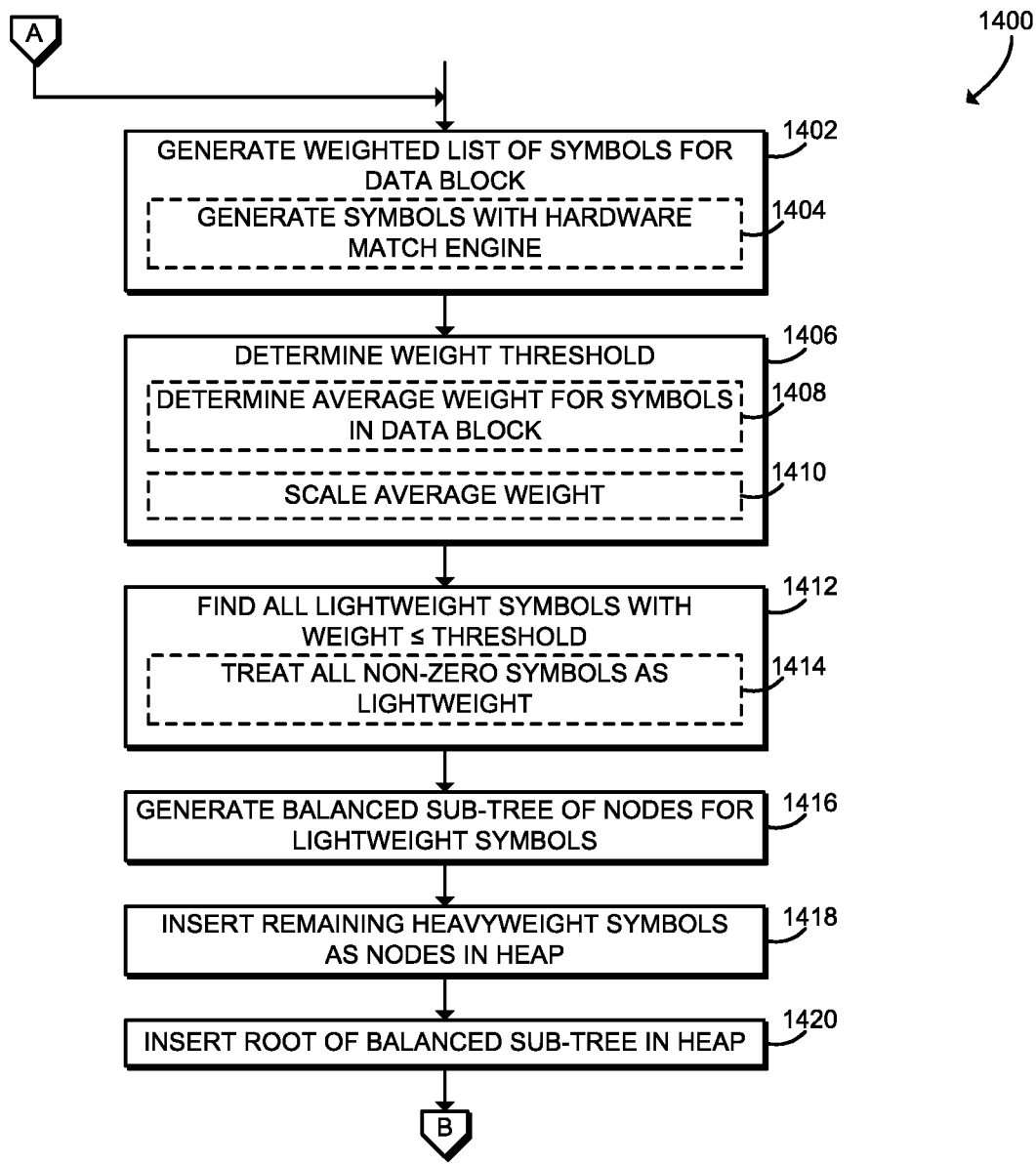
FIGS. 14A and 14B are a simplified flow diagram of at least one embodiment of a method for heuristic Huffman code generation that may be executed by the computing device of FIGS. 12-13.
Figure 14B:
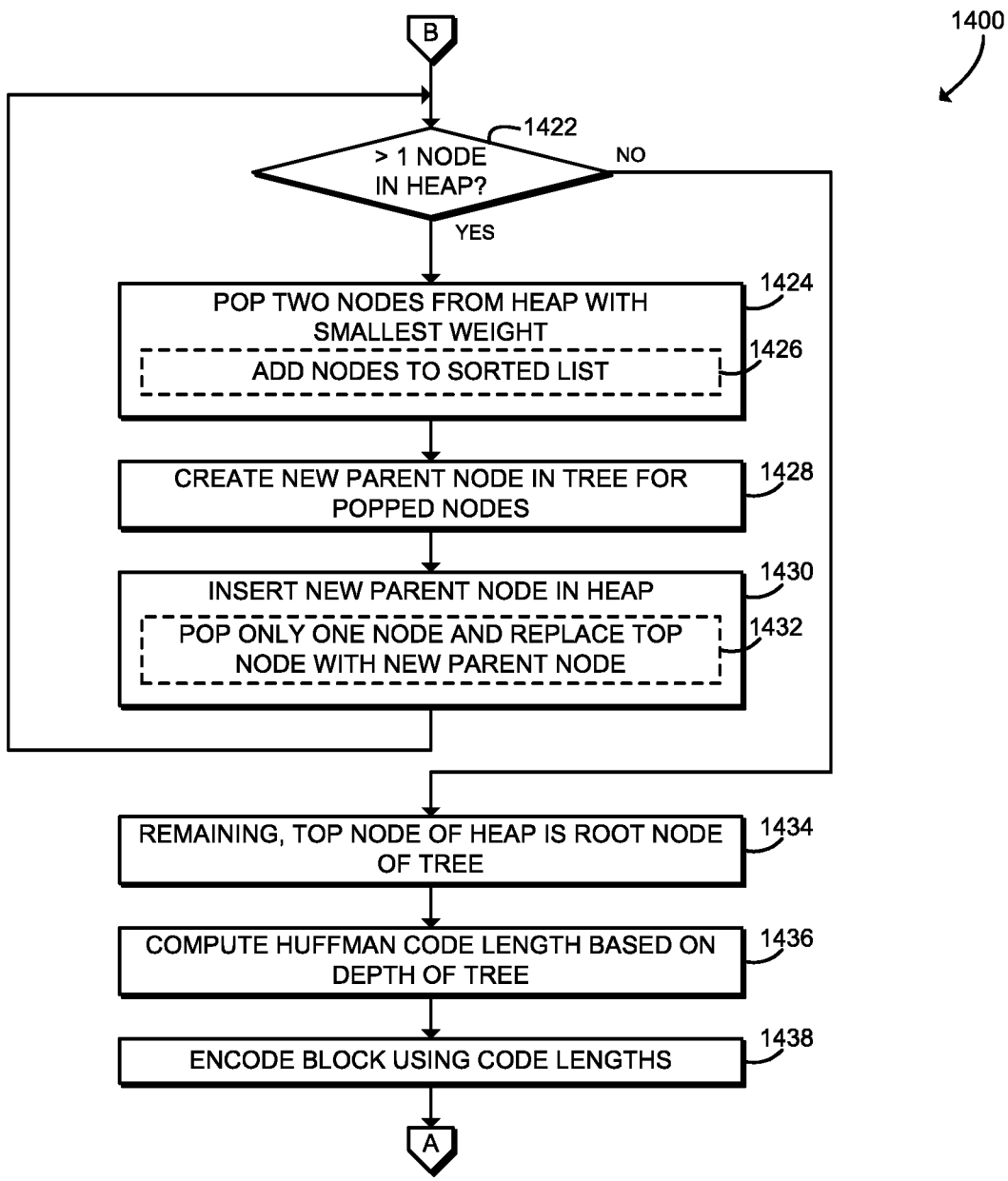

Referring now to FIGS. 14A and 14B, in use, the computing device 1200 may execute a method 1400 for heuristic Huffman code generation. It should be appreciated that, in some embodiments, the operations of the method 1400 may be performed by one or more components of the environment 1300 of the computing device 1200 as shown in FIG. 13. The method 1400 begins in block 1402, in which the computing device 1200 generates a weighted list 1316 of symbols for a data block 1314. As described above, the symbol list 1316 may be generated during execution of a DEFLATE compression algorithm. The computing device 1200 may generate a stream of output symbols based on the data block 1314. The output symbols may include literal symbols, length symbols, or distance symbols, and each particular symbol may occur in the data block 1314 with a particular frequency. The symbol list 1316 thus may include a list of all symbols that occur with non-zero frequency in the data block 1314. The symbol list 1316 may include length/literal symbols or distance symbols. Because length/literal symbols and distance symbols use separate dictionaries in DEFLATE, the method 1400 may be performed independently for each type of symbols. In some embodiments, the method 1400 may be performed for only one type of symbols (e.g., length/literal symbols), and a static or otherwise predetermined Huffman code may be used for the other type of symbols (e.g., distance symbols). In some embodiments, in block 1404 the symbols may be generated with a hardware match engine. For example, the symbol list 1316 may be generated with a hardware compression engine, accelerator, or other hardware offload engine.

In block 1406, the computing device 1200 determines a weight threshold. The weight threshold is used to identify lightweight symbols that are not processed with the heap 1310 to determine an optimal Huffman code. Thus, a larger threshold may identify a larger amount of lightweight symbols, which may improve performance (by reducing heap processing time) at the cost of increased compression ratio (i.e., larger compressed data size). Conversely, a smaller threshold may identify a smaller amount of lightweight symbols, which may reduce performance (by increasing heap processing time) but improve compression ratio (i.e., produce a smaller compressed data size). The weight threshold may be tuned or otherwise adjusted for a particular application, device, or data, for example by a user or developer. In some embodiments, in block 1408, the computing device 1200 may determine an average weight for the symbols in the data block 1314. As described above, the compression engine 1302 may generate the total number of symbols with non-zero weight and the total weight of all symbols. The computing device 1200 may divide the total weight by the number of non-zero symbols to determine the average, for example in software. The average weight may be used as the threshold weight. Using the average weight may provide for scalable performance for different block sizes and/or data formats, which may result in widely different occurrence frequencies. In some embodiments, in block 1410 the average weight may be scaled by a scaling factor. The scaled average weight may be used as the threshold weight. The scaling factor may be constant, provided by a user, or otherwise predetermined. Thus, the scaling factor may be used to tune the performance of the computing device 1200 against the compression ratio achieved.

In block 1412, the computing device 1200 finds all lightweight symbols of the symbol list 1316 having a weight less than or equal to the threshold weight. Of course, in other embodiments the lightweight symbols may have a weight that is less than the threshold weight or that otherwise has a predetermined relationship to the threshold weight. In some embodiments, in block 1318 the computing device 1200 may treat all symbols as lightweight symbols. In those embodiments, the computing device 1200 may perform a simplified heuristic that avoids performing heap operations. The simplified heuristic may provide relatively good performance but with a higher compression ratio (i.e., larger compressed data size).

In block 1416, the computing device 1200 generates a balanced sub-tree of nodes for the lightweight symbols. The computing device 1200 may use any appropriate algorithm to generate the balanced sub-tree. The leaves of the balanced sub-tree each correspond to a lightweight symbol. The root node of the balanced subtree has a weight that is equal to the sum of the weights of all of the lightweight symbols included in the balanced sub-tree. The computing device 1200 may add all leaf nodes of the balanced sub-tree (corresponding to the lightweight symbols) to the semi-sorted node list 1320. Because the nodes of the balanced sub-tree are not sorted, those nodes may be added to the semi-sorted node list 1320 in any order.

In block 1418, the computing device 1200 inserts the remaining, heavyweight symbols of the symbol list 1316 as nodes in the heap 1310. That is, the computing device 1200 inserts the symbols having a weight greater than the threshold weight into the heap 1310. The heap 1310 may be embodied as a min-heap, with the top node having the smallest associated weight. After each insertion, the heap 1310 may be processed (e.g., sifted or otherwise heapified) to maintain the heap property invariant that each node has a smaller associated weight than its child nodes. In block 1420, the computing device 1200 inserts the root node of the balanced sub-tree into the heap 1310. Again, the heap 1310 is processed to maintain the heap property invariant.

In block 1422, shown in FIG. 14B, the computing device 1200 determines whether more than one node is included in the heap 1310. If not (e.g., if the heap 1310 has one node), the method 1400 branches ahead to block 1434. Note that the simplified heuristic includes all symbols in the balanced sub-tree, as described above in connection with block 1414 of FIG. 14A. Thus, when executing with the simplified heuristic, the heap 1310 may include only the root node of the balanced sub-tree and thus the method 1400 may always skip to block 1434. Referring back to block 1422, if more than one node is included in the heap 1310, the method 1400 advances to block 1424.

In block 1424, the computing device 1200 pops two nodes from the heap 1310. Because the top node of the heap 1310 always has the smallest weight of the nodes in the heap 1310, those two popped nodes correspond to the nodes with the two smallest weights in the heap 1310. In block 1426, in some embodiments the popped nodes may be added to the semi-sorted node list 1320. Because nodes with smaller weights are popped off the heap 1310 first, the popped nodes are added to the semi-sorted node list 1320 in sorted order, from smaller weight to larger.

In block 1428, the computing device 1200 creates a new parent node for the two popped nodes. The parent-child relationship between the newly created parent node and the popped child nodes is recorded in the Huffman code tree 1318, for example by recording pointers from the child nodes to the parent. The weight of the newly created parent node is set to the sum of the weights of both child nodes. In block 1432, the newly created parent node is inserted in the heap 1310. As described above, after insertion, the heap 1310 may perform one or more sift/heapify operations to maintain the heap property. In some embodiments, in block 1432 the computing device 100 may pop only a single node from the heap 1310 and then replace the top of the heap 1310 with the newly created parent node. Using a single pop operation in combination with a replace operation may improve performance over performing two pop operations and an insert operation, because the heap 1310 must maintain the heap property after each pop, insert, or replace operation.

After inserting the new parent node into the heap 1310, the method 1400 loops back to block 1400 to continue processing heap nodes. As describe above, the computing device 1200 continues to process heap nodes until a single node remains in the heap 1310, and then branches to block 1434.

In block 1434, the computing device 1200 identifies the remaining, top node of the heap 1310 as the root node of the Huffman code tree 1318. The remaining node may also be added to the semi-sorted node list 1320. Thus, the semi-sorted node list 1320 includes a list of symbols, ordered roughly from smallest to largest weight. The Huffman code tree 1318 includes pointers from each child node to its parent. Because the parent node always has a larger weight than its children, if the semi-sorted node list 1320 is traversed from largest to smallest, the parent node may always be processed before either of its children.

In block 1436, the computing node 1200 computes the Huffman code length for each symbol based on the depth of the Huffman code tree 1318. In block 1438, the computing device 1200 encodes the data block 1314 using the code lengths. For example, the computing device 1200 may determine a Huffman code for each symbol based on the code length, and then encode each symbol in a stream of symbols generated by the compression engine 1302 for the data block 1314. After encoding the data block 1314, the method 1400 loops back to block 1402 shown in FIG. 14A to continue generating Huffman codes.

Although illustrated in FIGS. 14A-14B as using a heap-based algorithm to generate the Huffman code tree 1318, it should be understood that in other embodiments the computing device 1200 may use any typical Huffman code algorithm to generate the Huffman code tree 1318 from the remaining symbols (i.e., the heavyweight symbols) and the root of the balanced sub-tree.

Figure 15:
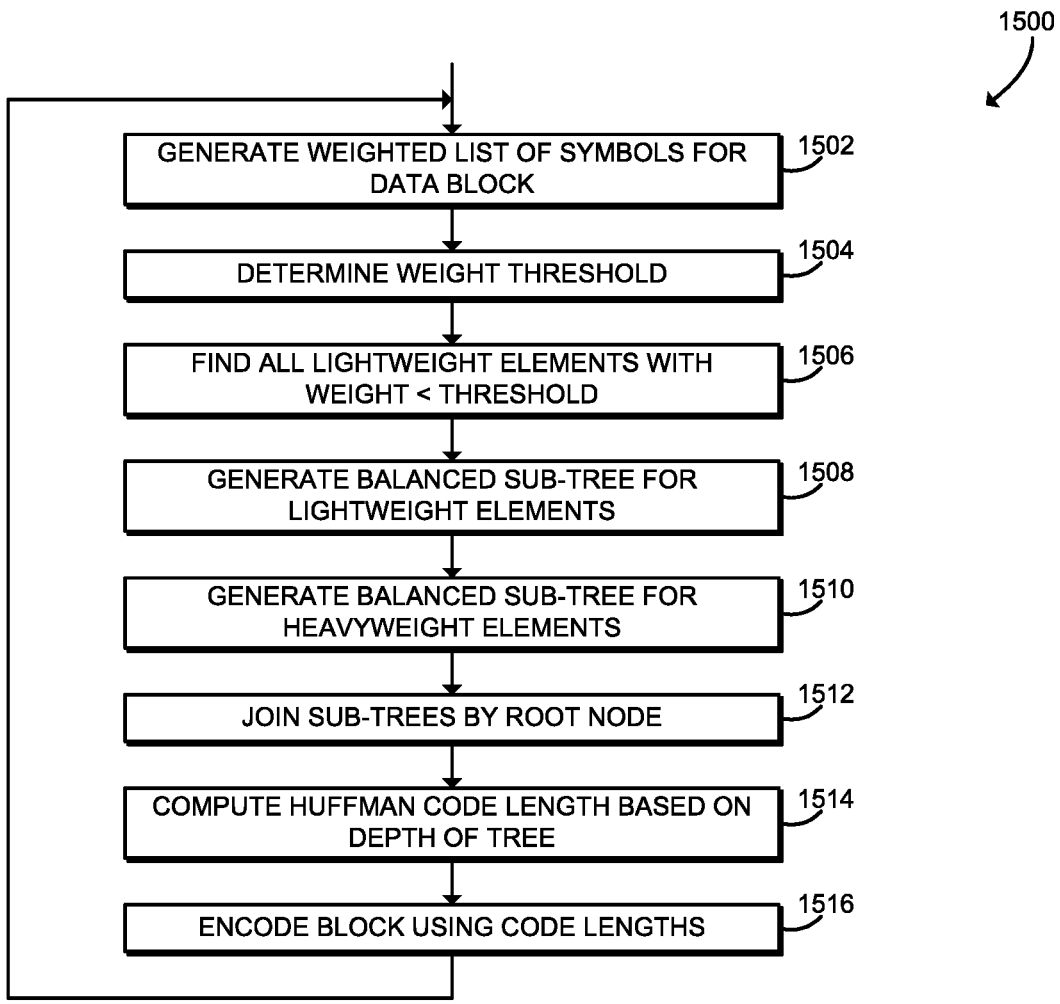
FIG. 15 is a simplified flow diagram of at least one embodiment of a method for a simplified heuristic Huffman code generation that may be executed by the computing device of FIGS. 12-13.

Referring now to FIG. 15, in use, the computing device 1200 may execute a method 1500 for simplified heuristic Huffman code generation. It should be appreciated that, in some embodiments, the operations of the method 1500 may be performed by one or more components of the environment 1300 of the computing device 1200 as shown in FIG. 13. The method 1500 begins in block 1502, in which the computing device 1200 generates a weighted list 1316 of symbols for a data block 1314. The computing device 1200 may generate the symbol list 1316 as described above in connection with block 1402 of FIG. 14A.

In block 1504, the computing device 1200 determines a weight threshold. The weight threshold is used to separate lightweight symbols from heavyweight symbols. The weight threshold may be selected based on the expected or actual ratio of lightweight to heavyweight symbols in the symbol list 1316. Generally, compression ratio for the simplified heuristic may be improved if there are more lightweight symbols than heavyweight symbols. For example, in some embodiments the weight threshold may be selected so that the lightweight symbols include about 2-3 times as many symbols as the heavyweight symbols.

In block 1506, the computing device 1200 finds all lightweight symbols of the symbol list 1316 having a weight less than or equal to the threshold weight. Of course, in other embodiments the lightweight symbols may have a weight that is less than the threshold weight or that otherwise have a predetermined relationship to the threshold weight. The remaining symbols (other than the lightweight symbols) are the heavyweight symbols.

In block 1508, the computing device 1200 generates a balanced sub-tree of nodes for the lightweight symbols. As described above in connection with block 1416 of FIG. 14A, the computing device 1200 may use any appropriate algorithm to generate the balanced sub-tree. The leaves of the balanced sub-tree each correspond to a lightweight symbol. Similarly, in block 1510 the computing device 1200 generates another balanced sub-tree of nodes for the heavyweight symbols. Each leaf of that balanced sub-tree corresponds to a heavyweight symbol.

In block 1512, the computing device 1200 joins the two balanced sub-trees by a root node to create the Huffman code tree 1318. Thus, the computing device 1200 may create the Huffman code tree 1318 without performing any sort operations or heap operations, and thus may improve performance (e.g., reduce cycles/byte).

In block 1514, the computing node 1200 computes the Huffman code length for each symbol based on the depth of the Huffman code tree 1318. In block 1438, the computing device 1200 encodes the data block 1314 using the code lengths. If the heavyweight symbols are fewer in number compared to the lightweight symbols, then the balanced sub-tree for the heavyweight symbols may have a smaller depth than the balanced sub-tree for the lightweight symbols. Accordingly, because the sub-trees are joined by the root node, in that example the heavyweight symbols may have a smaller depth and thus a shorter code length than the lightweight symbols. Because the heavyweight symbols are used more frequently than the lightweight symbols, the shorter code length may provide a better compression ratio (smaller compressed data sizes) as compared to using a single balanced tree for all symbols. The ratio of the number of heavyweight symbols to the number of lightweight symbols (and thus the compression ratio achieved) may be tuned by adjusting the threshold weight. After encoding the data block 1314, the method 1500 loops back to block 1502 to continue generating Huffman codes.

Figure 16A:
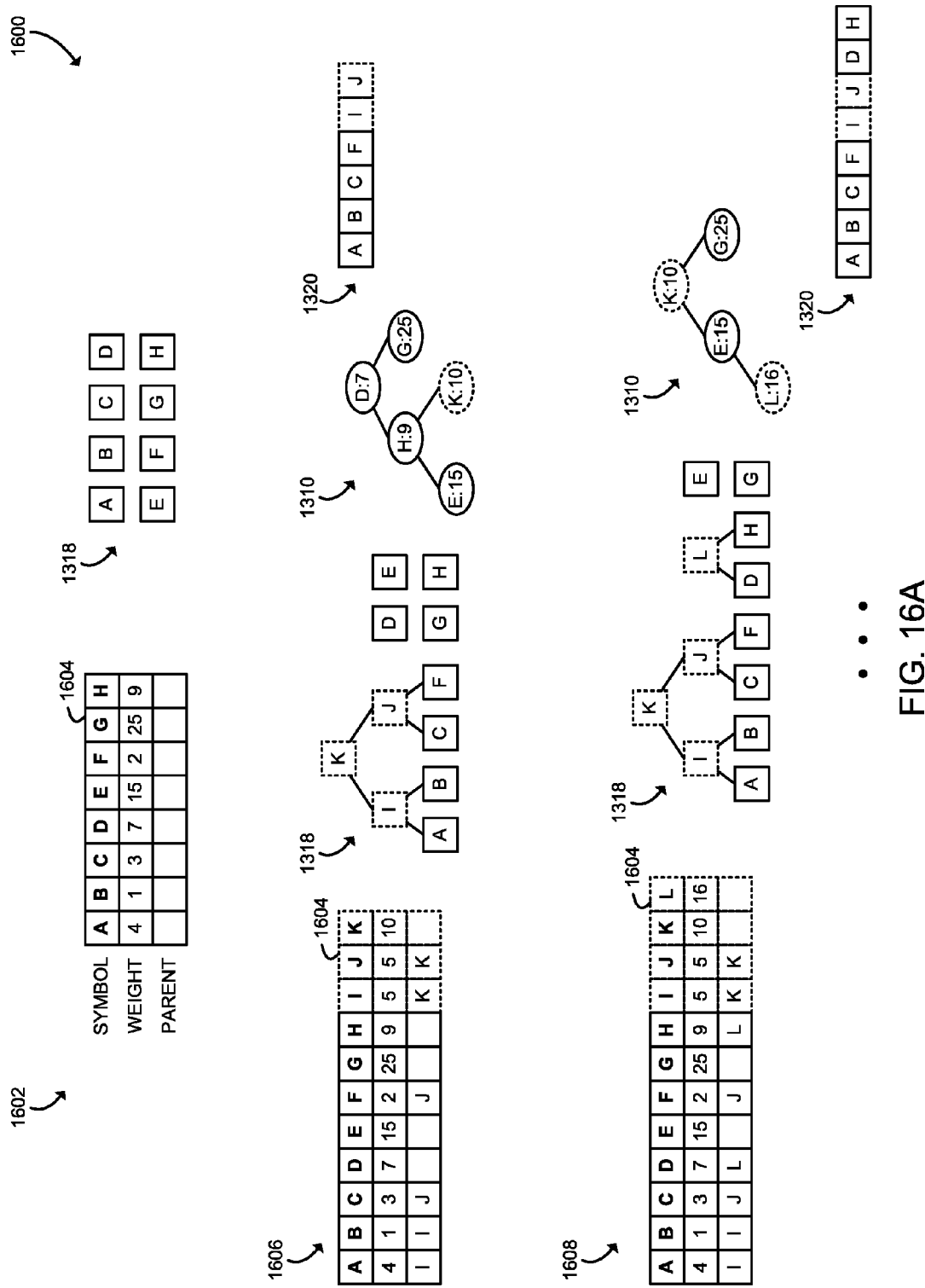
FIGS. 16A and 16B are a schematic diagram illustrating generation of a Huffman code tree by the computing device of FIGS. 12-13.
Figure 16B:
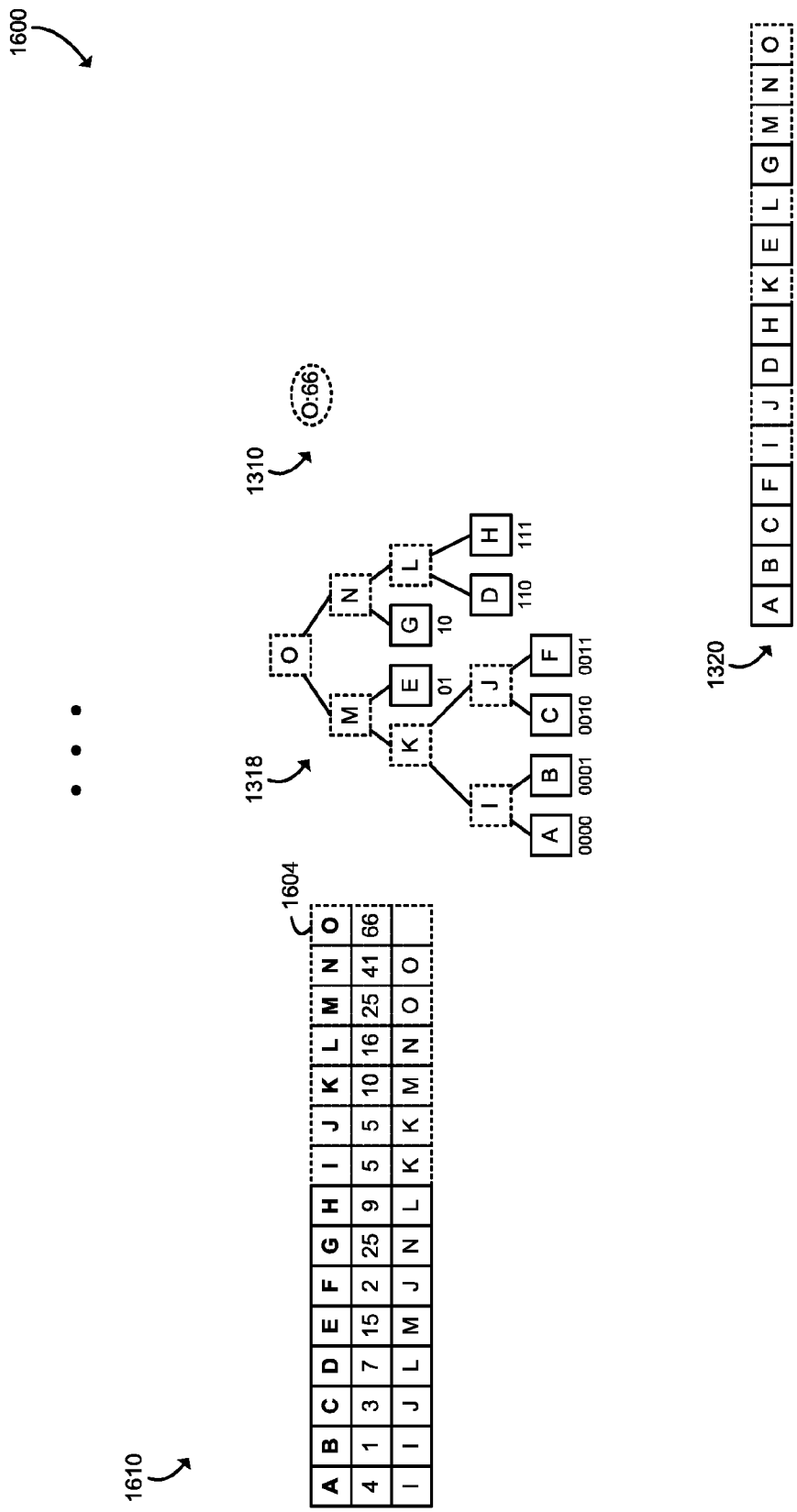

Referring now to FIGS. 16A and 16B, schematic diagram 1600 illustrates Huffman code generation as described above in connection with FIGS. 14A-14B. The code generation process starts in step 1602, in which the symbol list 1316 output from the compression engine 1302 is loaded into a tree array 1604. The tree array 1604 may be embodied as an array of elements. Each element includes two 16-bit values, which initially contain a weight and a pointer to the parent of the corresponding node. Later, during the code generation process, those two values may be replaced with the generated code and code length. Illustratively, the symbol list 1316 initially includes weights for eight symbols, labeled A through H. The index of the tree array 1604 may be used to implicitly identify the corresponding symbol A through H and thus the symbol may not be included in the tree array 1604 itself. As shown, the parent pointers for each node are initially null, and therefore the Huffman code tree 1318 does not include any tree structure between nodes.

Step 1606 of the diagram 1600 illustrates the code generation process after generation of the balanced sub-tree and initialization of the heap 1310 as described above in connection with blocks 1412-1420 of FIG. 14A. In the illustrative embodiment, the threshold weight is 4. Thus, symbols A, B, C, and F are lightweight symbols. The Huffman code tree 1318 includes a balanced sub-tree that includes the nodes A, B, C, and F. As shown, the balanced sub-tree also includes newly created nodes I, J, and K. K is the root of the balanced sub-tree, and has a weight of 10, equal to the sum of the weights of symbols A, B, C, and F. (Weights for the nodes I and J were also determined, but are not required for heuristic Huffman code generation). As shown, the tree array 1604 includes parent pointer values for nodes A, B, C, F, I, and J. Those parent pointer values were determined without performing any heap 1310 processing. The symbols A, B, C, F, I, and J have also been added to the semi-sorted list 1320 without performing a sort operation. As shown in step 1606, the remaining heavyweight symbols D, E, G, and H, as well as the root K of the sub-tree do not have parent pointer values assigned. Those nodes D, E, G, H, and K have been added to the heap 1310. The heap 1310 may be embodied as an array of indices into the tree array 1604. As shown, the node D at the top of the heap 1310 has the smallest associated weight of nodes in the heap 1310.

Step 1608 of the diagram 1600 illustrates the code generation process after performing one iteration of heap processing as described above in connection with blocks 1422-1432 of FIG. 14B. As shown, node D was removed from the heap 1310, which caused node H to move to the top of the heap 1310. New node L was created, and the parent pointers of nodes D, H in the tree array 1604 were set to point to node L. The weight of node L was set to 16, the sum of the weights of nodes D and H. Node H in the heap 1310 was replaced with the new node L. Nodes D and H were added to the semi-sorted node list 1320 in order from smaller weight to larger. As shown, the Huffman code tree 1318 includes the sub-tree including lightweight symbols A, B, C, F, I, J, K as well as another sub-tree including symbols D, H, L. The code generation process continues performing heap processing iterations until the heap 1310 includes one node, as describe above in connection with FIG. 14B.

Referring now to FIG. 16B, step 1610 of the diagram 1600 illustrates the code generation process after heap processing is complete. As shown, the heap 1310 includes one node O, which is also the root node of the Huffman code tree 1318. Each symbol in the tree array 1604 (other than the root O) has both parent pointers set. The semi-sorted node list 1320 includes all nodes in the Huffman tree 1318, sorted roughly from smallest to largest weight. In particular, the nodes A, B, C, F, I, J (from the balanced sub-tree for the lightweight symbols) may be out of order and are thus considered to be equivalently small. The remaining nodes in the semi-sorted node list 1320, starting at node D, are sorted in order from smallest to largest. As shown, the completed Huffman code tree 1318 may be used to determine Huffman codes for the original symbols of the symbol list 1316.

It should be appreciated that, in some embodiments, the methods 1400 and/or 1500 may be embodied as various instructions stored on a computer-readable media, which may be executed by the processor 1220, the I/O subsystem 1222, the communications subsystem 1228 and/or other components of the computing device 1200 to cause the computing device 1200 to perform the respective method 1400 and/or 1500. The computer-readable media may be embodied as any type of media capable of being read by the computing device 1200 including, but not limited to, the memory 1224, the data storage device 1226, firmware devices, other memory or data storage devices of the computing device 1200, portable media readable by a peripheral device 1230 of the computing device 1200, and/or other media.

EXAMPLES

Illustrative examples of the technologies disclosed herein are provided below. An embodiment of the technologies may include any one or more, and any combination of, the examples described below.

Example 1 includes a computing device comprising: a heuristic processor to (i) determine a threshold weight for a list of symbols, wherein each symbol is associated with a weight, (ii) identify one or more lightweight symbols of the list of symbols, wherein the weight of each lightweight symbol has a predetermined relationship to the threshold weight, and (iii) generate a balanced sub-tree of nodes for the lightweight symbols, wherein each of the lightweight symbols is associated with a leaf node of the balanced sub-tree; and a tree processor to generate a Huffman code tree for any remaining symbols of the list of symbols other than the lightweight symbols and a root node of the balanced sub-tree.

Example 2 includes the subject matter of Example 1, and wherein the predetermined relationship comprises less than or equal to.

Example 3 includes the subject matter of any of Examples 1 and 2, and further comprising a Huffman encoder to: compute a Huffman code length for each symbol of the list of symbols based on a depth of a corresponding node in the Huffman code tree; and encode a data block with the Huffman code lengths; wherein the data block comprises a block of symbols.

Example 4 includes the subject matter of any of Examples 1-3, and further comprising a hardware compression engine to generate the list of symbols, wherein to identify the one or more lightweight symbols comprises to identify the one or more lightweight symbols in response to generation of the list of symbols.

Example 5 includes the subject matter of any of Examples 1-4, and wherein to determine the threshold weight for the list of symbols comprises to determine an average weight for each symbol of the list of symbols.

Example 6 includes the subject matter of any of Examples 1-5, and wherein to determine the threshold weight for the list of symbols further comprises to scale the average weight by a predetermined scale factor.

Example 7 includes the subject matter of any of Examples 1-6, and wherein the threshold weight is predetermined.

Example 8 includes the subject matter of any of Examples 1-7, and wherein to identify the one or more lightweight symbols of the list of symbols comprises to identify all symbols of the list of symbols as the lightweight symbols.

Example 9 includes the subject matter of any of Examples 1-8, and wherein to generate the Huffman code tree for the remaining symbols of the list of symbols and the root node of the balanced sub-tree comprises to: add the remaining symbols and the root node to a heap data structure; and while the heap data structure includes more than one node, to: pop a first node and a second node from the heap data structure, wherein the first node and the second node each have a weight, and wherein the weights of the first node and the second node are the smallest weights in the heap data structure; create a third node, wherein the third node is a parent node of the first node and the second node, and wherein a weight of the third node is a sum of the weight of first node and the weight of the second node; and insert the third node in the heap data structure.

Example 10 includes the subject matter of any of Examples 1-9, and wherein to generate the Huffman code tree further comprises to add the first node and the second node to a sorted list of nodes in response to a pop of the first node and the second node.

Example 11 includes the subject matter of any of Examples 1-10, and wherein to generate the Huffman code tree for the remaining symbols of the list of symbols and the root node of the balanced sub-tree comprises to: add the remaining symbols and the root node of the balanced sub-tree to a heap data structure; and while the heap data structure includes more than one node, to: pop a first node from the heap data structure, wherein the first node has a weight, and wherein the weight of the first node is the smallest weight in the heap data structure; create a second node, wherein the second node is a parent node of the first node and a third node, wherein the third node is at a top of the heap data structure, and wherein a weight of the second node is a sum of the weight of first node and the weight of the third node; and replace the third node in the heap data structure with the second node.

Example 12 includes a computing device comprising a heuristic processor to: determine a threshold weight for a list of symbols, wherein each symbol is associated with a weight; identify one or more lightweight symbols of the list of symbols, wherein the weight of each lightweight symbol has a predetermined relationship to the threshold weight; generate a first balanced sub-tree of nodes for the lightweight symbols, wherein each of the lightweight symbols is associated with a leaf node of the first balanced sub-tree; generate a second balanced sub-tree of nodes for one or more remaining symbols of the list of symbols other than the lightweight symbols, wherein each of the remaining symbols is associated with a leaf node of the second balanced sub-tree; and join the first balanced sub-tree and the second balanced sub-tree with a root node to generate a Huffman code tree.

Example 13 includes the subject matter of Example 12, and wherein the predetermined relationship comprises less than or equal to.

Example 14 includes the subject matter of any of Examples 12 and 13, and further comprising a Huffman encoder to: compute a Huffman code length for each symbol of the list of symbols based on a depth of a corresponding node in the Huffman code tree; and encode a data block with the Huffman code lengths, wherein the data block comprises a block of symbols.

Example 15 includes the subject matter of any of Examples 12-14, and further comprising a hardware compression engine to generate the list of symbols, wherein to identify the one or more lightweight symbols comprises to identify the one or more lightweight symbols in response to generation of the list of symbols.

Example 16 includes a method comprising: determining, by a computing device, a threshold weight for a list of symbols, wherein each symbol is associated with a weight; identifying, by the computing device, one or more lightweight symbols of the list of symbols, wherein the weight of each lightweight symbol has a predetermined relationship to the threshold weight; generating, by the computing device, a balanced sub-tree of nodes for the lightweight symbols, wherein each of the lightweight symbols is associated with a leaf node of the balanced sub-tree; and generating, by the computing device, a Huffman code tree for any remaining symbols of the list of symbols other than the lightweight symbols and a root node of the balanced sub-tree.

Example 17 includes the subject matter of Example 16, and wherein the predetermined relationship comprises less than or equal to.

Example 18 includes the subject matter of any of Examples 16 and 17, and further comprising: computing, by the computing device, a Huffman code length for each symbol of the list of symbols based on a depth of a corresponding node in the Huffman code tree; and encoding, by the computing device, a data block with the Huffman code lengths, wherein the data block comprises a block of symbols.

Example 19 includes the subject matter of any of Examples 16-18, and further comprising generating, by a hardware compression engine of the computing device, the list of symbols, wherein identifying the one or more lightweight symbols comprises identifying the one or more lightweight symbols in response to generating the list of symbols.

Example 20 includes the subject matter of any of Examples 16-19, and wherein determining the threshold weight for the list of symbols comprises determining an average weight for each symbol of the list of symbols.

Example 21 includes the subject matter of any of Examples 16-20, and wherein determining the threshold weight for the list of symbols further comprises scaling the average weight by a predetermined scale factor.

Example 22 includes the subject matter of any of Examples 16-21, and wherein the threshold weight is predetermined.

Example 23 includes the subject matter of any of Examples 16-22, and wherein identifying the one or more lightweight symbols of the list of symbols comprises identifying all symbols of the list of symbols as the lightweight symbols.

Example 24 includes the subject matter of any of Examples 16-23, and wherein generating the Huffman code tree for the remaining symbols of the list of symbols and the root node of the balanced sub-tree comprises: adding the remaining symbols and the root node to a heap data structure; and while the heap data structure includes more than one node: popping a first node and a second node from the heap data structure, wherein the first node and the second node each have a weight, and wherein the weights of the first node and the second node are the smallest weights in the heap data structure; creating a third node, wherein the third node is a parent node of the first node and the second node, and wherein a weight of the third node is a sum of the weight of first node and the weight of the second node; and inserting the third node in the heap data structure.

Example 25 includes the subject matter of any of Examples 16-24, and wherein generating the Huffman code tree further comprises adding the first node and the second node to a sorted list of nodes in response to popping the first node and the second node.

Example 26 includes the subject matter of any of Examples 16-25, and wherein generating the Huffman code tree for the remaining symbols of the list of symbols and the root node of the balanced sub-tree comprises: adding the remaining symbols and the root node of the balanced sub-tree to a heap data structure; and while the heap data structure includes more than one node: popping a first node from the heap data structure, wherein the first node has a weight, and wherein the weight of the first node is the smallest weight in the heap data structure; creating a second node, wherein the second node is a parent node of the first node and a third node, wherein the third node is at a top of the heap data structure, and wherein a weight of the second node is a sum of the weight of first node and the weight of the third node; and replacing the third node in the heap data structure with the second node.

Example 27 includes a method comprising: determining, by a computing device, a threshold weight for a list of symbols, wherein each symbol is associated with a weight; identifying, by the computing device, one or more lightweight symbols of the list of symbols, wherein the weight of each lightweight symbol has a predetermined relationship to the threshold weight; generating, by the computing device, a first balanced sub-tree of nodes for the lightweight symbols, wherein each of the lightweight symbols is associated with a leaf node of the first balanced sub-tree; generating, by the computing device, a second balanced sub-tree of nodes for one or more remaining symbols of the list of symbols other than the lightweight symbols, wherein each of the remaining symbols is associated with a leaf node of the second balanced sub-tree; and joining, by the computing device, the first balanced sub-tree and the second balanced sub-tree with a root node to generate a Huffman code tree.

Example 28 includes the subject matter of Example 27, and wherein the predetermined relationship comprises less than or equal to.

Example 29 includes the subject matter of any of Examples 27 and 28, and further comprising: computing, by the computing device, a Huffman code length for each symbol of the list of symbols based on a depth of a corresponding node in the Huffman code tree; and encoding, by the computing device, a data block with the Huffman code lengths, wherein the data block comprises a block of symbols.

Example 30 includes the subject matter of any of Examples 27-29, and further comprising generating, by a hardware compression engine of the computing device, the list of symbols, wherein identifying the one or more lightweight symbols comprises identifying the one or more lightweight symbols in response to generating the list of symbols.

Example 31 includes a computing device comprising: a processor; and a memory having stored therein a plurality of instructions that when executed by the processor cause the computing device to perform the method of any of Examples 16-30.

Example 32 includes one or more machine readable storage media comprising a plurality of instructions stored thereon that in response to being executed result in a computing device performing the method of any of Examples 16-30.

Example 33 includes a computing device comprising means for performing the method of any of Examples 16-30.

Example 34 includes a computing device comprising: means for determining a threshold weight for a list of symbols, wherein each symbol is associated with a weight; means for identifying one or more lightweight symbols of the list of symbols, wherein the weight of each lightweight symbol has a predetermined relationship to the threshold weight; means for generating a balanced sub-tree of nodes for the lightweight symbols, wherein each of the lightweight symbols is associated with a leaf node of the balanced sub-tree; and means for generating a Huffman code tree for any remaining symbols of the list of symbols other than the lightweight symbols and a root node of the balanced sub-tree.

Example 35 includes the subject matter of Example 34, and wherein the predetermined relationship comprises less than or equal to.

Example 36 includes the subject matter of any of Examples 34 and 35, and further comprising: means for computing a Huffman code length for each symbol of the list of symbols based on a depth of a corresponding node in the Huffman code tree; and means for encoding a data block with the Huffman code lengths, wherein the data block comprises a block of symbols.

Example 37 includes the subject matter of any of Examples 34-36, and further comprising means for generating, by a hardware compression engine of the computing device, the list of symbols, wherein identifying the one or more lightweight symbols comprises identifying the one or more lightweight symbols in response to generating the list of symbols.

Example 38 includes the subject matter of any of Examples 34-37, and wherein the means for determining the threshold weight for the list of symbols comprises means for determining an average weight for each symbol of the list of symbols.

Example 39 includes the subject matter of any of Examples 34-38, and wherein the means for determining the threshold weight for the list of symbols further comprises means for scaling the average weight by a predetermined scale factor.

Example 40 includes the subject matter of any of Examples 34-39, and wherein the threshold weight is predetermined.

Example 41 includes the subject matter of any of Examples 34-40, and wherein the means for identifying the one or more lightweight symbols of the list of symbols comprises means for identifying all symbols of the list of symbols as the lightweight symbols.

Example 42 includes the subject matter of any of Examples 34-41, and wherein the means for generating the Huffman code tree for the remaining symbols of the list of symbols and the root node of the balanced sub-tree comprises: means for adding the remaining symbols and the root node to a heap data structure; and while the heap data structure includes more than one node: means for popping a first node and a second node from the heap data structure, wherein the first node and the second node each have a weight, and wherein the weights of the first node and the second node are the smallest weights in the heap data structure; means for creating a third node, wherein the third node is a parent node of the first node and the second node, and wherein a weight of the third node is a sum of the weight of first node and the weight of the second node; and means for inserting the third node in the heap data structure.

Example 43 includes the subject matter of any of Examples 34-42, and wherein the means for generating the Huffman code tree further comprises means for adding the first node and the second node to a sorted list of nodes in response to popping the first node and the second node.

Example 44 includes the subject matter of any of Examples 34-43, and wherein the means for generating the Huffman code tree for the remaining symbols of the list of symbols and the root node of the balanced sub-tree comprises: means for adding the remaining symbols and the root node of the balanced sub-tree to a heap data structure; and while the heap data structure includes more than one node: means for popping a first node from the heap data structure, wherein the first node has a weight, and wherein the weight of the first node is the smallest weight in the heap data structure; means for creating a second node, wherein the second node is a parent node of the first node and a third node, wherein the third node is at a top of the heap data structure, and wherein a weight of the second node is a sum of the weight of first node and the weight of the third node; and means for replacing the third node in the heap data structure with the second node.

Example 45 includes a computing device comprising: means for determining a threshold weight for a list of symbols, wherein each symbol is associated with a weight; means for identifying one or more lightweight symbols of the list of symbols, wherein the weight of each lightweight symbol has a predetermined relationship to the threshold weight; means for generating a first balanced sub-tree of nodes for the lightweight symbols, wherein each of the lightweight symbols is associated with a leaf node of the first balanced sub-tree; means for generating a second balanced sub-tree of nodes for one or more remaining symbols of the list of symbols other than the lightweight symbols, wherein each of the remaining symbols is associated with a leaf node of the second balanced sub-tree; and means for joining the first balanced sub-tree and the second balanced sub-tree with a root node to generate a Huffman code tree.

Example 46 includes the subject matter of Example 45, and wherein the predetermined relationship comprises less than or equal to.

Example 47 includes the subject matter of any of Examples 45 and 46, and further comprising: means for computing a Huffman code length for each symbol of the list of symbols based on a depth of a corresponding node in the Huffman code tree; and means for encoding a data block with the Huffman code lengths, wherein the data block comprises a block of symbols.

Example 48 includes the subject matter of any of Examples 45-47, and further comprising means for generating, by a hardware compression engine of the computing device, the list of symbols, wherein identifying the one or more lightweight symbols comprises identifying the one or more lightweight symbols in response to generating the list of symbols.

The invention claimed is:

1. A computing device comprising:
a heuristic processor to (i) determine a threshold weight for a list of symbols, wherein each symbol is associated with a weight, (ii) identify one or more lightweight symbols of the list of symbols, wherein the weight of each lightweight symbol has a predetermined relationship to the threshold weight, and (iii) generate a balanced sub-tree of nodes for the lightweight symbols, wherein each of the lightweight symbols is associated with a leaf node of the balanced sub-tree; and
a tree processor to generate a Huffman code tree for any remaining symbols of the list of symbols other than the lightweight symbols and a root node of the balanced sub-tree.

2. The computing device of claim 1, wherein the predetermined relationship comprises less than or equal to.

3. The computing device of claim 1, further comprising a Huffman encoder to:
compute a Huffman code length for each symbol of the list of symbols based on a depth of a corresponding node in the Huffman code tree; and
encode a data block with the Huffman code lengths, wherein the data block comprises a block of symbols.

4. The computing device of claim 1, further comprising a hardware compression engine to generate the list of symbols, wherein to identify the one or more lightweight symbols comprises to identify the one or more lightweight symbols in response to generation of the list of symbols.

5. The computing device of claim 1, wherein to determine the threshold weight for the list of symbols comprises to determine an average weight for each symbol of the list of symbols.

6. The computing device of claim 5, wherein to determine the threshold weight for the list of symbols further comprises to scale the average weight by a predetermined scale factor.

7. The computing device of claim 1, wherein to identify the one or more lightweight symbols of the list of symbols comprises to identify all symbols of the list of symbols as the lightweight symbols.

8. The computing device of claim 1, wherein to generate the Huffman code tree for the remaining symbols of the list of symbols and the root node of the balanced sub-tree comprises to:
add the remaining symbols and the root node to a heap data structure; and
while the heap data structure includes more than one node, to:
pop a first node and a second node from the heap data structure, wherein the first node and the second node each have a weight, and wherein the weights of the first node and the second node are the smallest weights in the heap data structure;
create a third node, wherein the third node is a parent node of the first node and the second node, and wherein a weight of the third node is a sum of the weight of first node and the weight of the second node; and
insert the third node in the heap data structure.

9. The computing device of claim 8, wherein to generate the Huffman code tree further comprises to add the first node and the second node to a sorted list of nodes in response to a pop of the first node and the second node.

10. The computing device of claim 1, wherein to generate the Huffman code tree for the remaining symbols of the list of symbols and the root node of the balanced sub-tree comprises to:
add the remaining symbols and the root node of the balanced sub-tree to a heap data structure; and
while the heap data structure includes more than one node, to:
pop a first node from the heap data structure, wherein the first node has a weight, and wherein the weight of the first node is the smallest weight in the heap data structure;
create a second node, wherein the second node is a parent node of the first node and a third node, wherein the third node is at a top of the heap data structure, and wherein a weight of the second node is a sum of the weight of first node and the weight of the third node; and replace the third node in the heap data structure with the second node.

11. One or more computer-readable storage media comprising a plurality of instructions that in response to being executed cause a computing device to:
 determine a threshold weight for a list of symbols, wherein each symbol is associated with a weight;
 identify one or more lightweight symbols of the list of symbols, wherein the weight of each lightweight symbol has a predetermined relationship to the threshold weight;
 generate a balanced sub-tree of nodes for the lightweight symbols, wherein each of the lightweight symbols is associated with a leaf node of the balanced sub-tree; and
 generate a Huffman code tree for any remaining symbols of the list of symbols other than the lightweight symbols and a root node of the balanced sub-tree.

12. The one or more computer-readable storage media of claim 11, wherein the predetermined relationship comprises less than or equal to.

13. The one or more computer-readable storage media of claim 11, wherein to determine the threshold weight for the list of symbols comprises to determine an average weight for each symbol of the list of symbols.

14. The one or more computer-readable storage media of claim 13, wherein to determine the threshold weight for the list of symbols further comprises to scale the average weight by a predetermined scale factor.

15. The one or more computer-readable storage media of claim 11, wherein to identify the one or more lightweight symbols of the list of symbols comprises to identify all symbols of the list of symbols as the lightweight symbols.

16. The one or more computer-readable storage media of claim 11, wherein to generate the Huffman code tree for the remaining symbols of the list of symbols and the root node of the balanced sub-tree comprises to:
 add the remaining symbols and the root node to a heap data structure; and
 while the heap data structure includes more than one node:
  pop a first node and a second node from the heap data structure, wherein the first node and the second node each have a weight, and wherein the weights of the first node and the second node are the smallest weights in the heap data structure;
  create a third node, wherein the third node is a parent node of the first node and the second node, and wherein a weight of the third node is a sum of the weight of first node and the weight of the second node; and
  insert the third node in the heap data structure.

17. The one or more computer-readable storage media of claim 16, wherein to generate the Huffman code tree further comprises to add the first node and the second node to a sorted list of nodes in response to popping the first node and the second node.

18. The one or more computer-readable storage media of claim 11, wherein to generate the Huffman code tree for the remaining symbols of the list of symbols and the root node of the balanced sub-tree comprises to:
 add the remaining symbols and the root node of the balanced sub-tree to a heap data structure; and
 while the heap data structure includes more than one node:
  pop a first node from the heap data structure, wherein the first node has a weight, and wherein the weight of the first node is the smallest weight in the heap data structure;
  create a second node, wherein the second node is a parent node of the first node and a third node, wherein the third node is at a top of the heap data structure, and wherein a weight of the second node is a sum of the weight of first node and the weight of the third node; and
  replace the third node in the heap data structure with the second node.

19. A computing device comprising a heuristic processor to:
 determine a threshold weight for a list of symbols, wherein each symbol is associated with a weight;
 identify one or more lightweight symbols of the list of symbols, wherein the weight of each lightweight symbol has a predetermined relationship to the threshold weight;
 generate a first balanced sub-tree of nodes for the lightweight symbols, wherein each of the lightweight symbols is associated with a leaf node of the first balanced sub-tree;
 generate a second balanced sub-tree of nodes for one or more remaining symbols of the list of symbols other than the lightweight symbols, wherein each of the remaining symbols is associated with a leaf node of the second balanced sub-tree; and
 join the first balanced sub-tree and the second balanced sub-tree with a root node to generate a Huffman code tree.

20. The computing device of claim 19, wherein the predetermined relationship comprises less than or equal to.

21. The computing device of claim 19, further comprising a Huffman encoder to:
 compute a Huffman code length for each symbol of the list of symbols based on a depth of a corresponding node in the Huffman code tree; and
 encode a data block with the Huffman code lengths, wherein the data block comprises a block of symbols.

22. The computing device of claim 19, further comprising a hardware compression engine to generate the list of symbols, wherein to identify the one or more lightweight symbols comprises to identify the one or more lightweight symbols in response to generation of the list of symbols.

23. One or more computer-readable storage media comprising a plurality of instructions that in response to being executed cause a computing device to:
 determine a threshold weight for a list of symbols, wherein each symbol is associated with a weight;
 identify one or more lightweight symbols of the list of symbols, wherein the weight of each lightweight symbol has a predetermined relationship to the threshold weight;
 generate a first balanced sub-tree of nodes for the lightweight symbols, wherein each of the lightweight symbols is associated with a leaf node of the first balanced sub-tree;
 generate a second balanced sub-tree of nodes for one or more remaining symbols of the list of symbols other than the lightweight symbols, wherein each of the remaining symbols is associated with a leaf node of the second balanced sub-tree; and
 join the first balanced sub-tree and the second balanced sub-tree with a root node to generate a Huffman code tree.

24. The one or more computer-readable storage media of claim 23, wherein the predetermined relationship comprises less than or equal to.

* * * * *